(12) United States Patent
Sun et al.

(10) Patent No.: US 12,076,771 B2
(45) Date of Patent: Sep. 3, 2024

(54) METAL SHELL AND MANUFACTURING PROCESS METHOD THEREOF

(71) Applicants: FUYU PRECISION COMPONENT(KUNSHAN)CO., LTD., Suzhou (CN); Foxconn Technology Co., Ltd., New Taipei (TW)

(72) Inventors: Ching-Sheng Sun, New Taipei (TW); Fuh-Feng Tang, New Taipei (TW); Ming-Hui Lin, New Taipei (TW); Yong Yang, Kunshan (CN); Ning Zhang, Kunshan (CN); Hung-Chun Ma, New Taipei (TW)

(73) Assignees: FUYU PRECISION COMPONENT(KUNSHAN)CO., LTD., Suzhou (CN); Foxconn Technology Co., Ltd., New Taipei (TW)

( * ) Notice: Subject to any disclaimer, the term of this patent is extended or adjusted under 35 U.S.C. 154(b) by 213 days.

(21) Appl. No.: 17/740,949

(22) Filed: May 10, 2022

(65) Prior Publication Data
US 2022/0371069 A1 Nov. 24, 2022

(30) Foreign Application Priority Data
May 18, 2021 (CN) .......................... 202110542294.0

(51) Int. Cl.
B21D 22/02 (2006.01)
B23C 3/12 (2006.01)
B23P 19/04 (2006.01)

(52) U.S. Cl.
CPC ................ B21D 22/02 (2013.01); B23C 3/12 (2013.01); B23P 19/04 (2013.01)

(58) Field of Classification Search
CPC ...... B21D 22/02; B21D 35/006; B21D 53/00; B21D 19/08; B23P 19/04; B23P 15/00; B23C 3/12; B29C 45/14221; B29C 45/0055; B29C 45/1418; B29C 45/14336; B29L 2031/3481; H05K 5/0217
See application file for complete search history.

(56) References Cited

U.S. PATENT DOCUMENTS

2009/0111534 A1* 4/2009 Lu ........................ H05K 5/0243
455/575.1

FOREIGN PATENT DOCUMENTS

| CN | 109177036 | | 1/2019 | |
|---|---|---|---|---|
| CN | 109177036 A | * | 1/2019 | ......... B29C 45/1418 |
| CN | 109885130 | | 6/2019 | |
| CN | 109885130 A | * | 6/2019 | |
| TW | 200829348 A | * | 7/2008 | |
| TW | 200922741 A | * | 6/2009 | |

* cited by examiner

*Primary Examiner* — Bayan Salone
(74) *Attorney, Agent, or Firm* — ScienBiziP, P.C.

(57) ABSTRACT

A method for manufacturing a metal shell for casing of electronic product comprises stamping, squeezing and milling a sheet metal at a first area and a second area to form hinge side walls. The sheet metal on the periphery is stamped, squeezed, and milled to form side walls. Insert molding is performed at inner surface of the sheet metal to form an internal molded plastic part and a fine machining of the sheet metal is carried out. The metal shell is integrally formed from a single solid sheet, the manufacturing process is simple and economical as CNC processes are reduced.

14 Claims, 13 Drawing Sheets

METAL SHELL AND MANUFACTURING PROCESS METHOD THEREOF

CROSS-REFERENCE TO RELATED APPLICATIONS

This application claims priority to China Application No. 202110542294.0, having a filing date of May 18, 2021, filed in China State Intellectual Property Administration, the entire contents of which is hereby incorporate by reference.

FIELD

The subject matter relates to metal processing technologies, and more particularly, to a metal shell and a manufacturing process thereof.

BACKGROUND

Thinner, lighter, and more durable notebooks with elegant appearance are popular with consumers. However, such notebooks present challenges for manufacturers of notebook shells. Notebook shells are mostly formed by metal stamping processes. However, the appearance of products made by stamping process may not be shiny or aesthetically appealing. Some notebook shells are made by hollowing a whole metal plate, but hollowing process requires many complex CNC processes, the cost may be too high for the market.

SUMMARY

An objective of the present disclosure is achieved by providing a manufacturing process method of a metal shell, comprising:

S2: stamping and hollowing out a sheet metal, the sheet metal is stamped at a first area and a second area to form two lug bosses, then top portions of the two lug bosses are hollowed to form notches with flanges on the sheet metal, wherein the first area and the second area are located on the same side of the sheet metal;

S4: thickening the flanges by squeezing, the flanges surrounding the notches being squeezed until the thickness of the flanges satisfies a first parameter;

S6: milling the flanges, the flanges are milled to have a height satisfy a second parameter, the flanges forming hinge side walls;

S8: stamping the sheet metal, the sheet metal is stamped on the periphery except for the first area and the second area, to form side walls;

S10: thickening the side walls by squeezing, the side walls being squeezed until the thickness of the side walls satisfies the first parameter;

S12: milling the side walls, until heights of the side walls satisfy a second parameter;

S14: T treatment, the sheet metal is roughened by a T treatment process to form nano-sized pits on inner surface;

S16: providing a mold on the sheet metal, as the mold is put in place on the sheet metal, feeding inlets being formed between the mold and the side walls of the sheet metal;

S18: arranging the injection nozzles, the injection nozzles being arranged in the feeding inlets;

S20: insert molding, an insert molding process is performed on the inner surface of the sheet metal to form a molded plastic part between the mold and the sheet metal, the molded plastic part being firmly fixed to the sheet metal;

S22: removing the mold;

S24: performing a fine machining on the sheet metal.

According to a further aspect, the step S2 further comprises following sub-steps:

S2-2: stamping the sheet metal, the sheet metal is stamped at the first area and the second area to form a first angle between the stamped areas and the plane perpendicular to the sheet metal, wherein the first angle is an acute angle;

S2-4: stamping the sheet metal a second time, the sheet metal is stamped at the first area and the second area to form right angles between the stamped areas and the plane perpendicular to the sheet metal, wherein two lug bosses are formed at the first area and the second area;

S2-6: hollowing out top portions of the two lug bosses, the top portions being removed to form two notches with flanges on the sheet metal.

According to a further aspect, the step S8 further comprises following sub-steps:

S8-2: stamping the sheet metal, the sheet metal is stamped at the periphery except for the first area and the second area to form a second angle between the stamped areas and the plane perpendicular to the sheet metal, the second angle is an acute angle;

S8-4: stamping the sheet metal a second time, the sheet metal is stamped at the periphery except for the first area and the second area to form right angles between the stamped areas and the sheet metal, then the side walls can be formed.

According to a further aspect, the sheet metal comprises a first side and a second side arranged relative to the first side, the two notches are formed at the first side.

According to a further aspect, the manufacturing process further comprises a step S13 between S12 and S14:

S13: bending the side walls, the side walls on the first side and the second side are bent, wherein a third angle is formed between the side walls on the first side and the sheet metal, and a fourth angle is formed between the side walls on the second side and the sheet metal.

According to a further aspect, each of the feeding inlets has a tapered area in a direction towards the mold.

According to a further aspect, the side wall is provided with a first step at the end of away from the sheet metal for providing a flared inlet between the first step and the mold, the flared inlet is connected to the feeding inlet, and the side wall is further provided with a groove on the inner side of the side wall, which groove extends in the longitudinal direction of the side wall.

According to a further aspect, the mold is arranged with a plurality of pressing points, the inner surface of the sheet metal is pressed at the pressing points when the mold is arranged on the sheet metal.

According to a further aspect, the injection nozzle comprises a first conduit, a second conduit, and a feeding nozzle connected in turn. Liquid resin flows from an injection machine through the first conduit and the second conduit and is fed into the feeding inlet via the feeding nozzle;

a fifth angel, which is an acute angle, is formed between the second conduit and the feeding nozzle.

According to a further aspect, the feeding nozzle at the end away from the second conduit has a lengthways dimension d1, between 7.5 mm-8 mm, and a widthways dimension w2, between 0.75 mm-0.85 mm.

According to a further aspect, the manufacturing process further comprises following steps between S22 and S24:

Step S23: machining the hinge side wall 153. Step S23 includes following sub-steps:

S23-2: cutting the hinge side wall, the hinge side walls are cut at the portion adjacent to the side walls to form gaps between the hinge side wall and the side wall.

S23-4: milling the hinge side wall, the hinge side walls are milled at their root to form a second step on outer side of the hinge side wall.

According to a further aspect, the step S24 comprises following sub-steps:

S24-2: thickening the side walls by squeezing, until the thickness of the side wall satisfy a third parameter;

S24-4: chamfering the sheet metal, the external corners on outer side of the sheet metal are chamfered to improve the appearance of the metal shell.

S24-6: applying surface treatment on the sheet metal, the surface treatment comprises at least one of: polishing, brush finishing, sand blasting, and anodizing, to improve the appearance of the metal shell.

According to a further aspect, the metal shell produced by the manufacturing process method comprises:

a sheet metal;

a molded plastic part attached to circumference of inner surface of the sheet metal;

wherein the sheet metal is arranged with hinge side walls and side walls, the hinge side walls and the side walls are formed by stamping and squeezing processes, the molded plastic part is strongly engaged with inner surfaces of the side walls and the inner surface of the sheet metal.

The process for manufacturing the metal shell provided by the present disclosure, causes the sheet metal to be stamped, squeezed, and milled at the first area and the second area to form the hinge side walls for hinges of the notebook computer. The sheet metal lis stamped, squeezed, and milled at the periphery to form the side walls and the molded plastic part is formed on the inner surface of the sheet metal by insert molding process. The molded plastic part is configured for connecting with internal elements of the notebook computers. The metal shell with plastic composite produced by the manufacturing process mentioned above is integrally formed from a whole piece of metal plate, the manufacturing process is simple and economical as CNC processes are reduced.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish elements and are not used to denote a particular order or imply a number of technical features, therefore, unless specifically defined, features described with "first" and "second" may expressly or implicitly include one or more of the stated features. In the present application, "plurality" means two or more.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

A detailed description of the hereinafter described embodiments of the disclosure is presented herein by way of exemplification and not limitation with reference to the figures.

Figure 1:
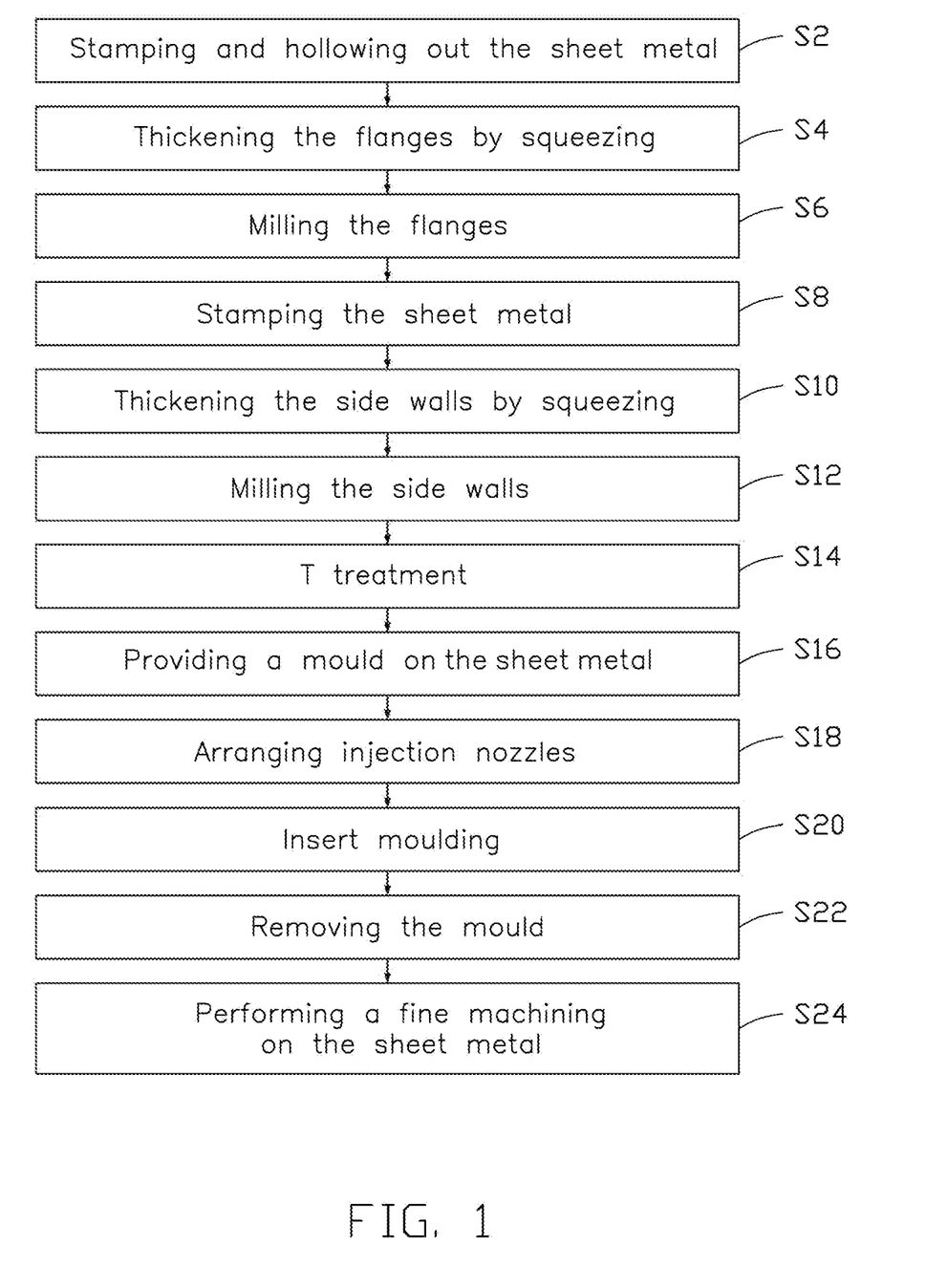
FIG. 1 is a flow diagram of a manufacturing process method of a metal shell of a first embodiment according to the present disclosure.

Referring to FIG. 1, a flow diagram of a manufacturing process method of a metal shell of a first embodiment according to the present disclosure is provided.

According to various requirements, some of the steps in the flow diagram can be omitted or be performed in different order. For simplicity and clarity of illustration, FIG. 1 shows steps performed only in a first embodiment.

In this embodiment, the sheet metal is made of aluminum alloy, magnesium-aluminum alloy, or other metal suitable for shells of electrical equipment. The electrical equipment is one or more of a notebook computer, a tablet computer, a phone, etc. The metal shell can be a shell for encasing a display screen on a notebook computer, or a backside shell for encasing a tablet computer, a mobile phone, and other device. This embodiment exemplifies a metal shell for encasing a display screen on a notebook computer, and it should be understood that this is not a limitation of the present application.

Figure 3:
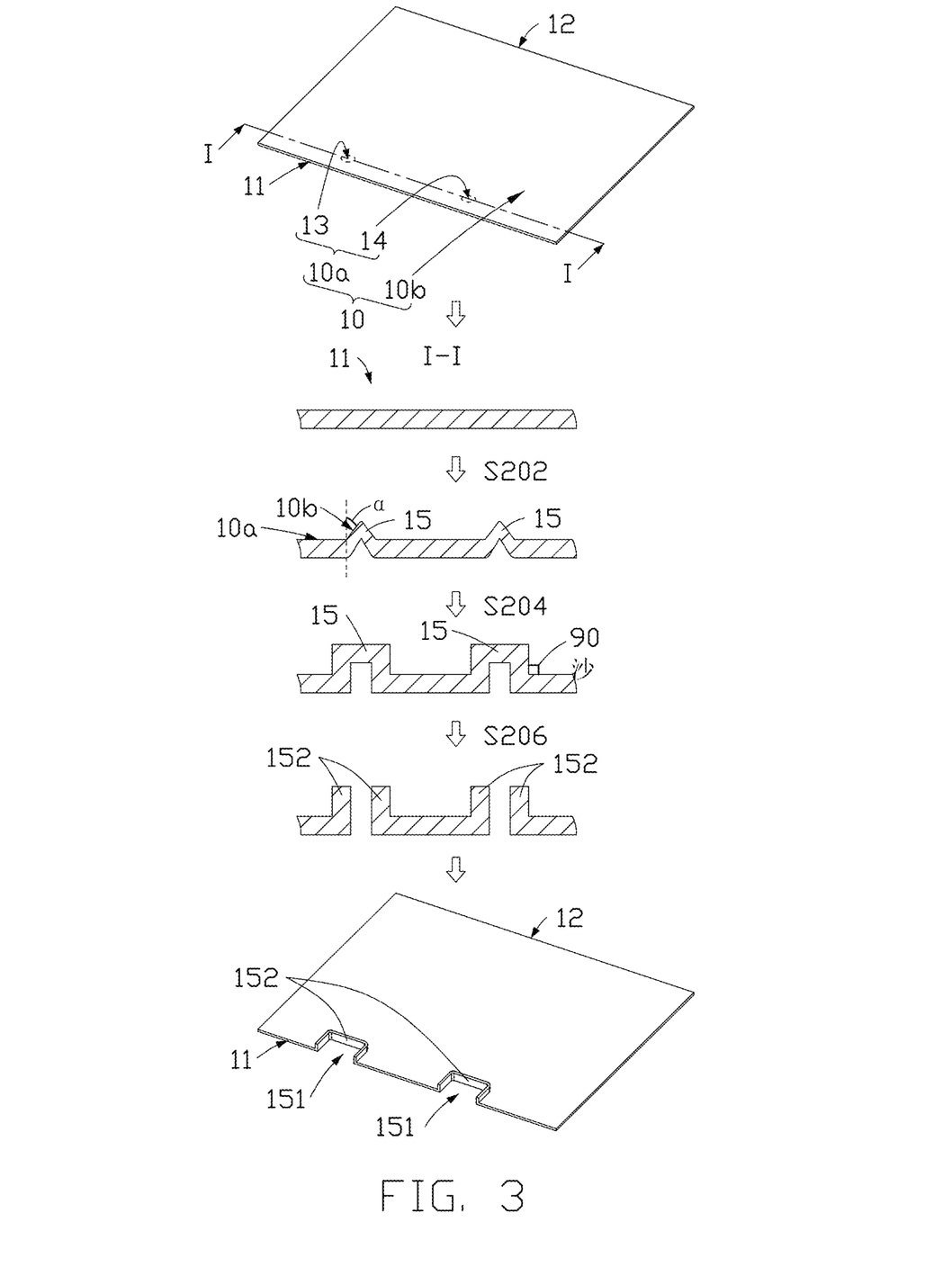
FIG. 3 illustrates the metal shell processed by step S2 of the first embodiment of method, according to the present disclosure.

In this embodiment, the sheet metal 10 is flat and has a substantially rectangular shape, which comprises a first side 11 and a second side 12 as the two long sides, the sheet metal 10 further comprises a first area 13 and a second area 14, both located on the same side of the sheet metal 10 at the first side 11.

The manufacturing process of the metal shell of the first embodiment comprises following steps:

Step S2: stamping and hollowing out the sheet metal 10, the sheet metal 10 is stamped at the first area 13 and the second area 14 to form two lug bosses 15, the top portions of the two lug bosses being removed to form two notches 151 with flanges on the sheet metal.

Figure 2:
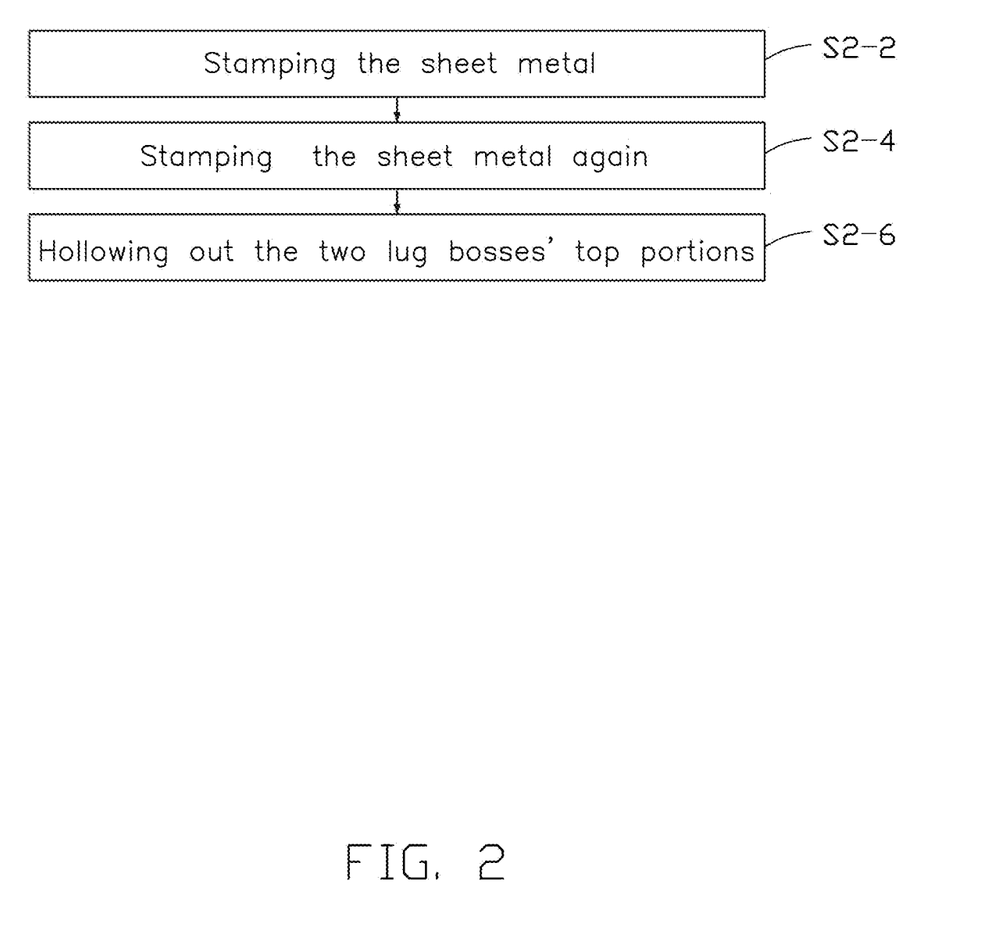
FIG. 2 shows sub-steps of step S2 of the manufacturing process of the first embodiment according to the present disclosure.

S2-2: stamping the sheet metal 10 to divide the metal sheet into a stamped area 10a and an unpunched area 10b, the sheet metal 10 is stamped at the first area 13 and the second area 14 to form acute angles between the stamped areas 10a and the plane perpendicular to the unpunched area 10b of the sheet metal 10.

In particular, the sheet metal 10 is stamped at the first area 13 and the second area 14 by a stamping equipment in a direction perpendicular to the sheet metal 10, to form a first angle a between the stamped areas and the perpendicular plane, wherein the first angle α is an acute angle preferred to be 70°. The first angle a can be 10° -80° in other embodiments. The stamping equipment used in step S2-2 is a 110-ton stamping machine.

S2-4: stamping the sheet metal 10 again, the sheet metal 10 is stamped at the first area 13 and the second area 14 again to form right angles between the stamped areas 10a and the unpunched area 10b of the sheet metal 10.

In particular, the sheet metal 10 is formed with two lug bosses 15 at the first area 13 and the second area 14, the stamping equipment used in step S2-4 is a 110-ton stamping machine.

The lug bosses 15 are formed by stamping in two sub-steps: S2-2 and S2-4, therefore the angle between the stamped areas and the perpendicular plane changes gradually, such process avoids fracture of the molecular bonding in the sheet metal 10 and adds structural strength to the sheet metal 10.

S2-6: hollowing out the top portions of the two lug bosses, the removal forms two notches 151 with flanges on the sheet metal 10.

In particular, the top portions of the two lug bosses 15 are cut off in a plane parallel to the sheet metal 10, only the side walls of the two lug bosses 15 remain, and two notches 151 with flanges 152 are formed.

Step S4: thickening the flanges 152 by squeezing, the flanges 152 surrounding the notches 151 are squeezed until the thickness of the flanges 152 satisfies a first parameter. The first parameter in this embodiment is thickness of 1.45 mm.

In particular, the flanges 152 are squeezed in a direction perpendicular to the sheet metal 10, then the flanges 152 are shortened and thickened. In this embodiment, the flanges 152 are squeezed twice, the thickness of the flanges 152 is 1.27 mm after a first squeezing and become 1.45 mm after a second squeezing. The two-step squeezing process avoids breaking the lug bosses 15 and increases structural strength of the lug bosses 15.

It should be readily understood by the skilled in the art that the squeezing process is not limited to a two-step squeezing, the lug bosses 15 could be squeezed more or less times. The power employed in squeezing can be increased or decreased accordingly.

Step S6: milling the flanges 152, the flanges 152 are milled to a height satisfying a second parameter, which forms hinge side walls 153. The second parameter can be set according to actual requirements.

Therefore, the hinge side walls 153 are formed on the sheet metal 10 by steps S2-S6.

Figure 5:
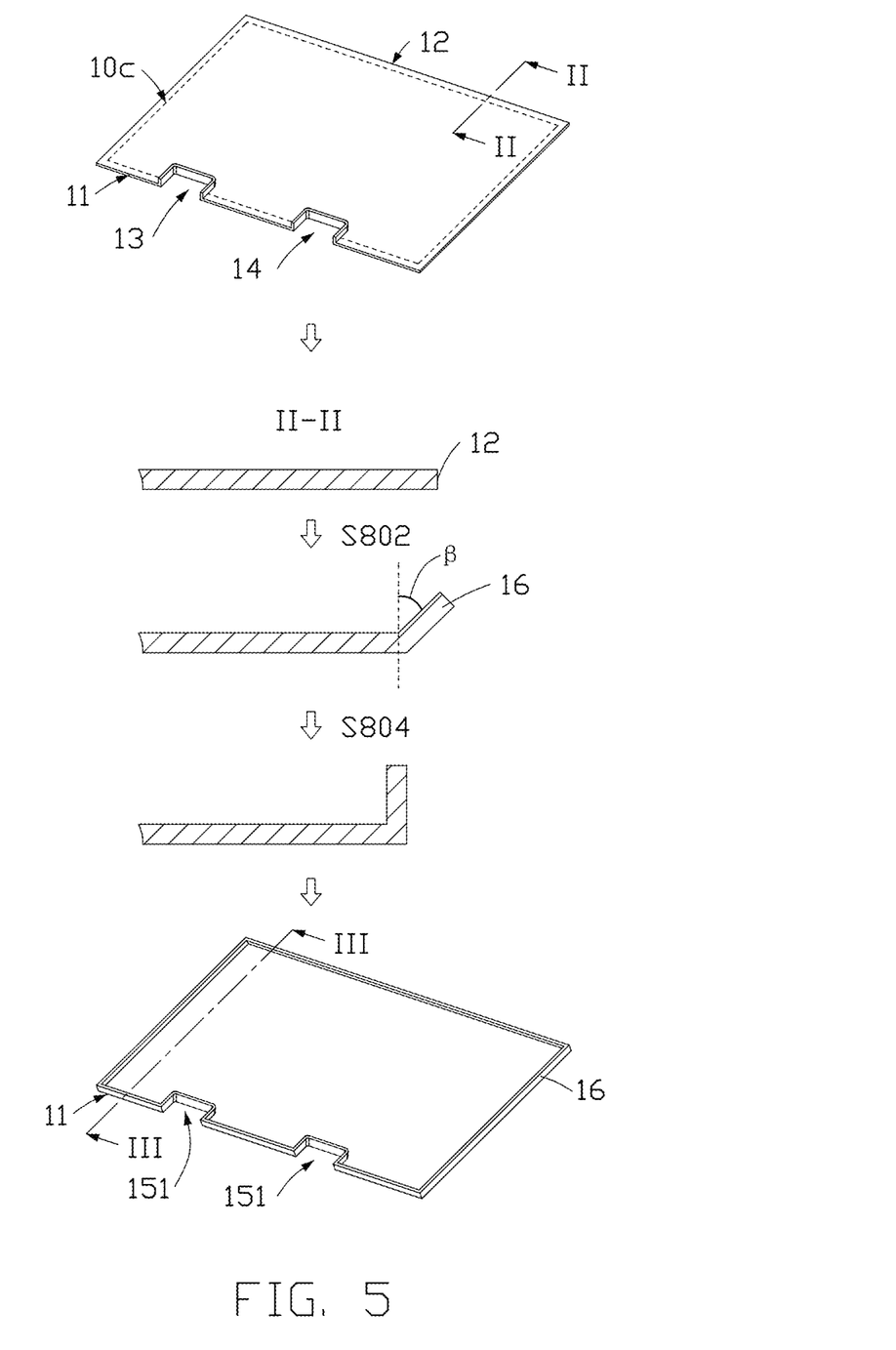
FIG. 5 illustrates a side wall of the metal shell processed by step S8 of the manufacturing process of the first embodiment according to the present disclosure.

Step S8: stamping the sheet metal 10, the sheet metal 10 is stamped on the periphery except for the first area13 and the second area 14, to form side walls 16.

In this embodiment, the periphery of the sheet metal 10 is stamped in a direction perpendicular to the sheet metal 10 so as to be bent away and form side walls.

Figure 4:
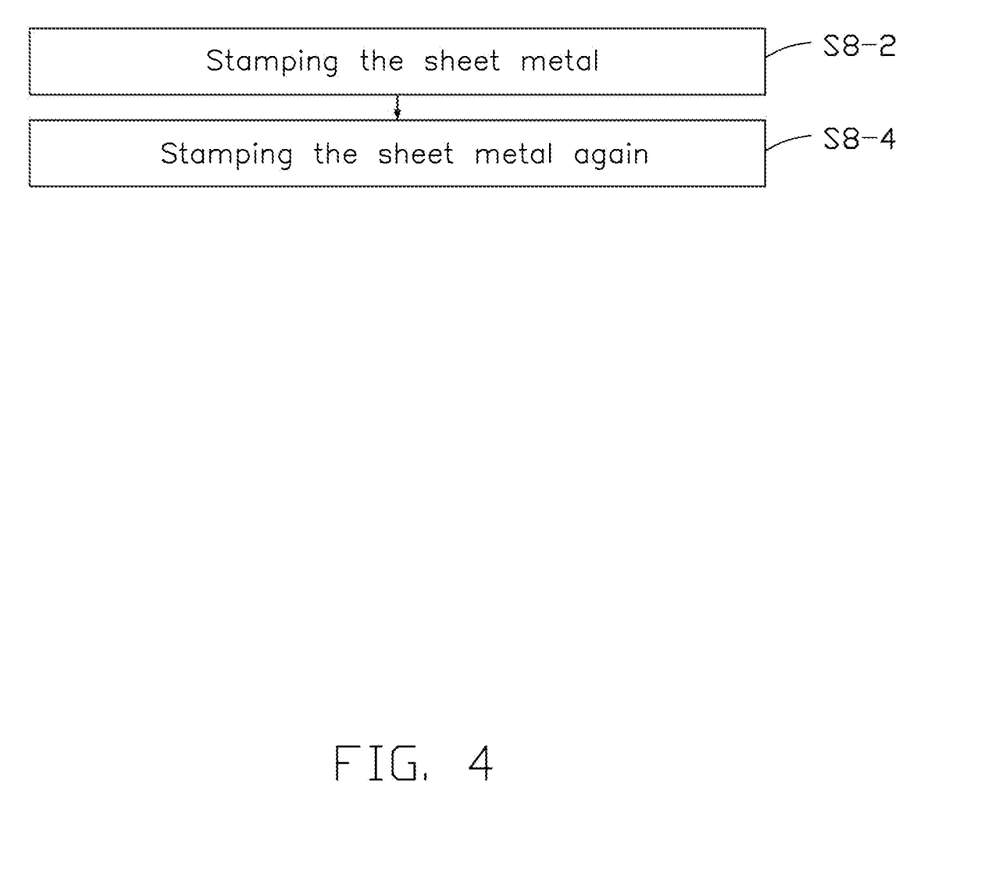
FIG. 4 shows sub-steps of step S8 of the manufacturing process of the first embodiment according to the present disclosure.

As shown in FIGs.4-5, the step S8 comprises following sub-steps:

S8-2: stamping the sheet metal 10, the periphery 10c of the sheet metal 10 except for the first area 13 and the second area 14 is stamped to form a second angle β between the periphery 10c of the sheet metal 10 except for the first area 13 and the second area 14 and the perpendicular plane, the second angle is an acute angle.

In particular, the sheet metal 10 is stamped at the periphery except for the first area 13 and the second area 14 in a direction perpendicular to the sheet metal 10, to form the second angle between the stamped areas and the perpendicular plane. The second angle β is an acute angle preferred to be 70°, the second angle β can be between 10° and 80° in other embodiments. The stamping equipment used in step S8-2 is a 160-ton stamping machine.

S8-4: stamping the sheet metal 10 again, the sheet metal 10 is stamped at the periphery 10c except for the first area 13 and the second area 14 to form right angles between the periphery 10c of the sheet metal 10 except for the first area 13 and the second area 14 and the unpunched area 10b of the sheet metal 10 except for the periphery 10c, thereby the side walls 16 are formed.

In particular, the sheet metal 10 is stamped again to form right angle between the stamped areas and the sheet metal 10, the stamping equipment used is a 110-ton stamping machine.

The side walls 16 formed by stamping in two substeps: S8-2 and S8-4, therefore the angle between the stamped areas and the perpendicular plane changes gradually, such process does not fracture molecular bonding and increases structural strength of the sheet metal 10.

In further embodiments, the angle between the side walls 16 and the sheet metal 10 is 80°.

Step S10: thickening the side walls 16 by squeezing, until the thickness of the side walls 16 satisfies the first parameter. The first parameter in this embodiment is 1.45 mm.

In particular, the side walls 16 are squeezed in a direction perpendicular to the sheet metal 10, then the side walls 16 are shortened and thickened. In this embodiment, the side walls 16 are squeezed twice, the thickness of the side walls 16 is 1.27 mm after a first squeezing and become 1.45 mm after a second squeezing. The two-step squeezing process does not fracture the side walls 16 and increases strength.

It should be readily understood for the skilled in the art that the squeezing process is not limited to a two-step squeezing, the side walls 16 could be squeezed more or less times, the squeezing power adjusted accordingly.

Step S12: milling the side walls 16, until the heights of the side walls 16 satisfy a second parameter. The second parameter is set according to actual requirements.

It should be readily understood for the skilled in the art that the height of the side walls 16 is not necessarily equal to that of the hinge side walls 153.

In further embodiments, the hinge side walls 153 and the side walls 16 are polished for improving appearance of the sheet metal 10.

Figure 6:
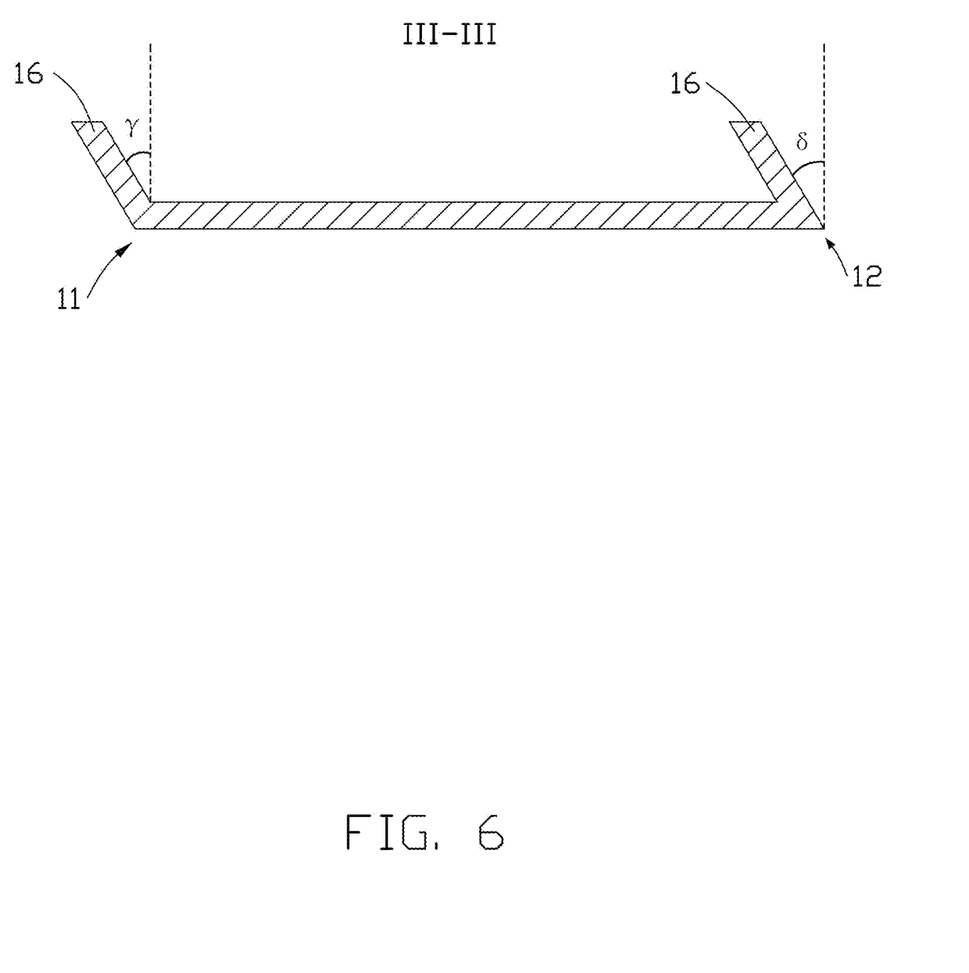
FIG. 6 illustrates a cross section of side walls of the metal shell processed by step S13 of the manufacturing process of a further embodiment according to the present disclosure.

In further embodiments, the processing of the sheet metal 10 further comprises following steps:

Step S13: bending the side walls 16, the side walls 16 on the first side 11 and the second side 12 are bent.

In particular, the side walls 16 on the first side 11 and the second side 12 are bent by a 110-ton machine, such that a third angle γ is formed between the side walls 16 on the first side 11 and the sheet metal 10, and a fourth angle δ is formed between the side walls 16 on the second side 12 and the sheet metal 10.

As shown in FIG. 6, in this embodiment, the side walls 16 on the first side 11 are bent away from the sheet metal 10, the third angle γ is 10°; the side walls 16 on the second side 12 are bent towards the sheet metal 10, the fourth angle δ is 16°. The side walls 16 may be bent towards or away from the sheet metal 10, the third angle γ and the fourth angle δ can be other acute angles in other embodiments.

In further embodiments, the side walls 16 on the short sides of the sheet metal 10 are bent.

In further embodiments, after step S12 or S13, the sheet metal 10 with hinge side walls 153 and side walls 16 is inspected for defects.

In further embodiments, the sheet metal 10 is further processed by insert molding. The processing steps are as follows.

Figure 7:
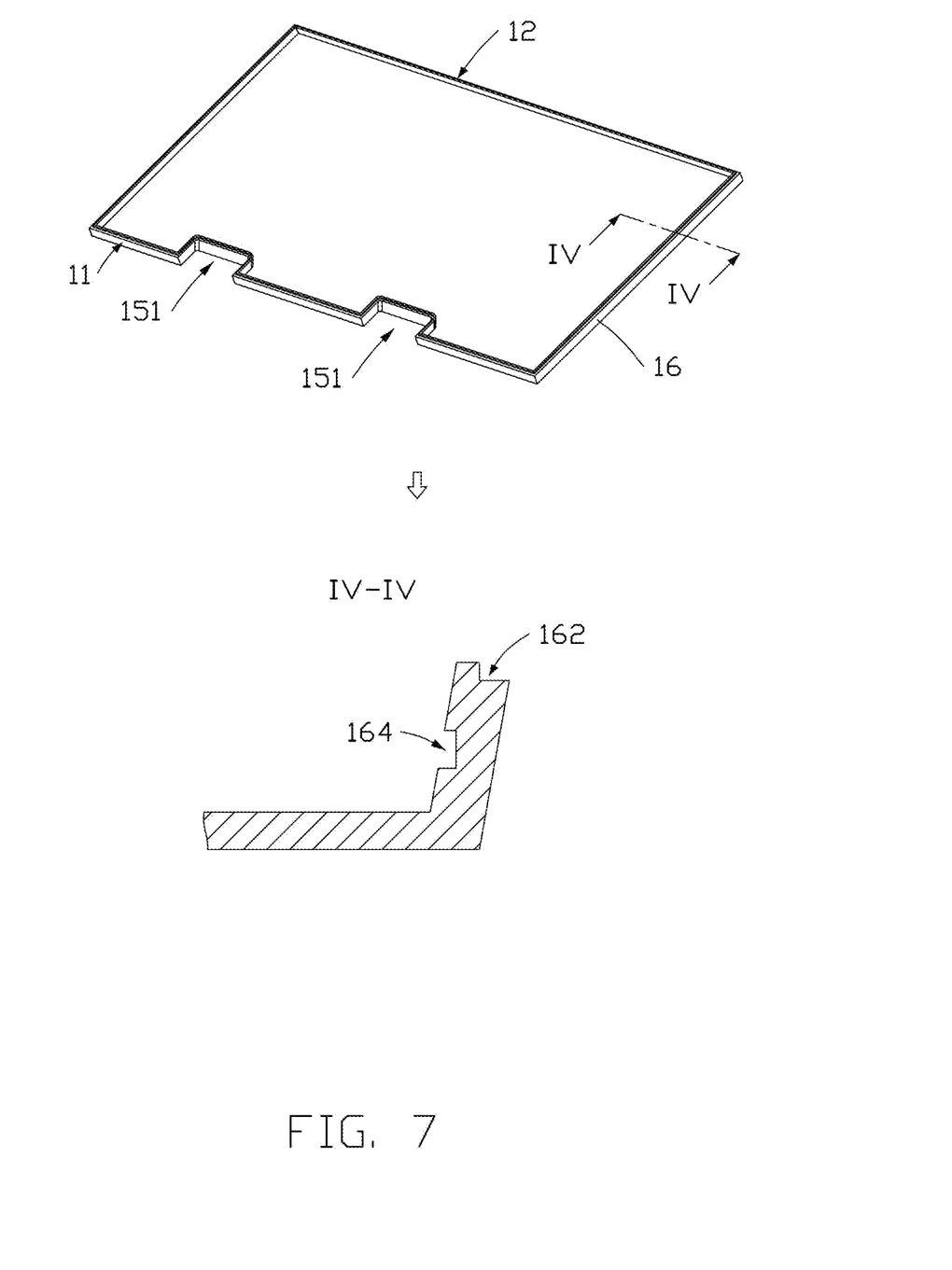
FIG. 7 illustrates the side wall with a first step and a groove of the further embodiment according to the present disclosure.

After inspection, the sheet metal 10 is processed by CNC machines to form a first step 162 on the end of the side wall 16 and a groove 164 on the inner side of the side wall 16, the groove 164 extends in the longitudinal direction of the side wall 16.

Step S14: T treatment, the inner surface of the sheet metal 10.

The T treatment applied to inner surface of the sheet metal 10 creates a roughened surface for improving the bonding between the sheet metal 10 and the molded plastic part 20. More specifically, the T treatment includes the following:

The sheet metal 10 is immersed in alkali solution, such that the inner surface is cleaned. In some embodiments, the alkali solution may be weak base at a pH of 9 to 10; then the sheet metal 10 is washed by water to remove the alkali solution; then the sheet metal 10 is immersed in acid solution to neutralize the pH of the inner surface; then the sheet metal 10 is immersed in the T solution to form nano-sized pits on the inner surface. The T treatment provides nano-sized pits of 20-40 nm, which improve the bonding between the sheet metal 10 and the molded plastic part 20.

Figure 8:
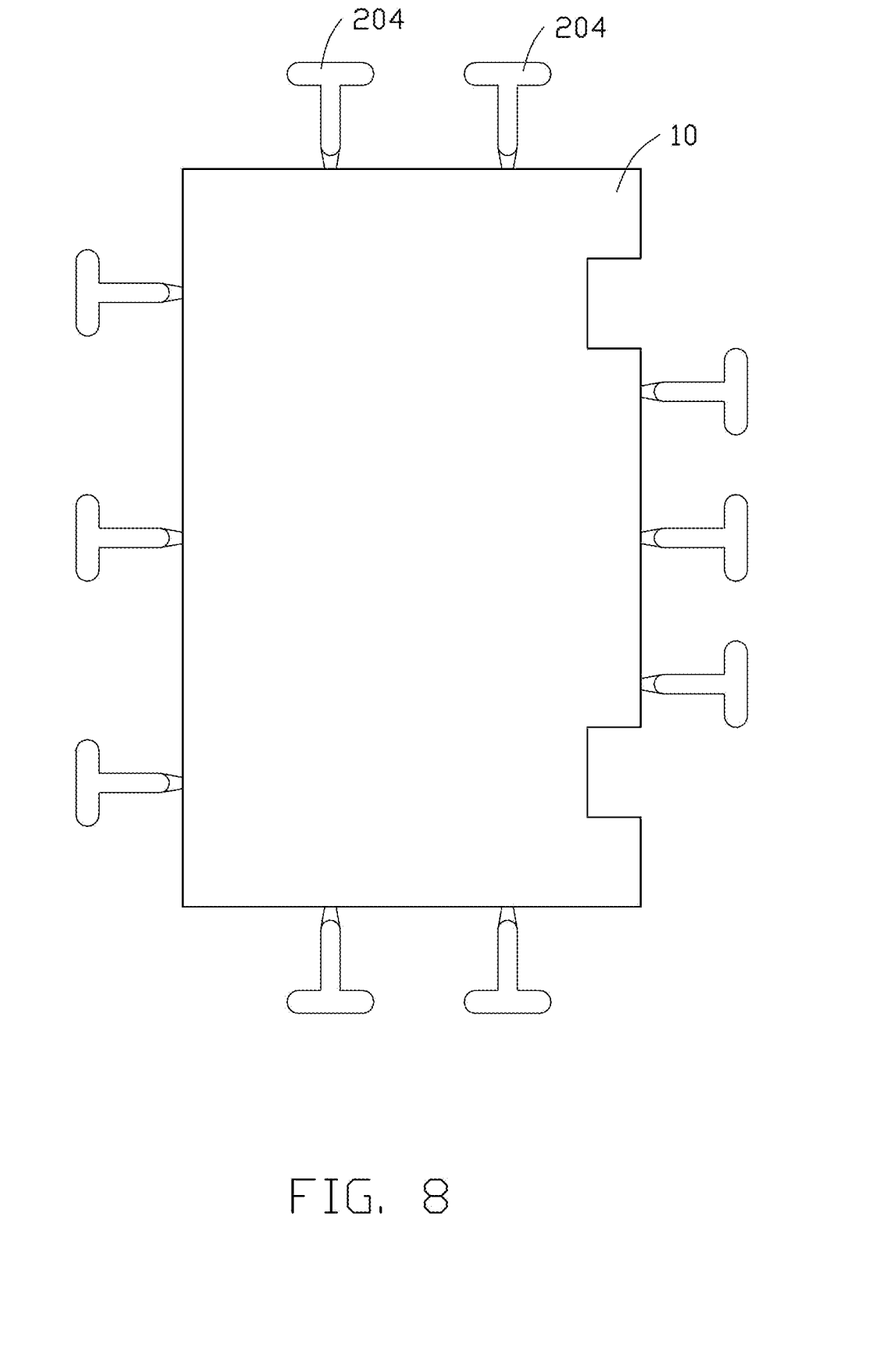
FIG. 8 shows an arrangement of the injection nozzle on the sheet metal of a further embodiment according to the present disclosure.

Step S16: providing a mold on the sheet metal, as the mold is put in place on the sheet metal 10, feeding inlets 202 being formed between the mold 200 and the side walls 16 of the sheet metal 10.

In particular, the mold 200 covers the whole inner surface of the sheet metal 10.

Figure 9:
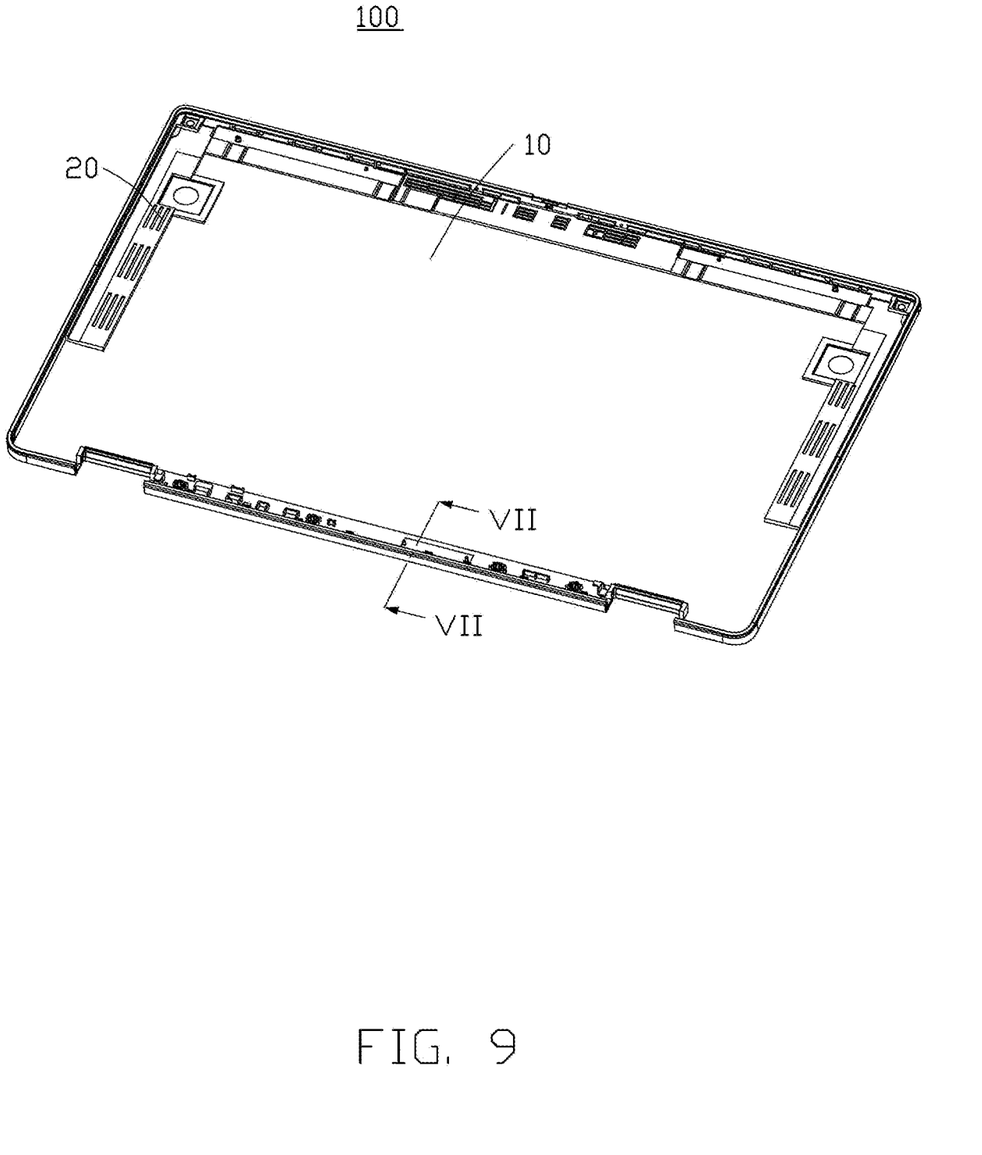
FIG. 9 illustrates the metal shell after insert molding process of another embodiment according to the present disclosure.
Figure 10:
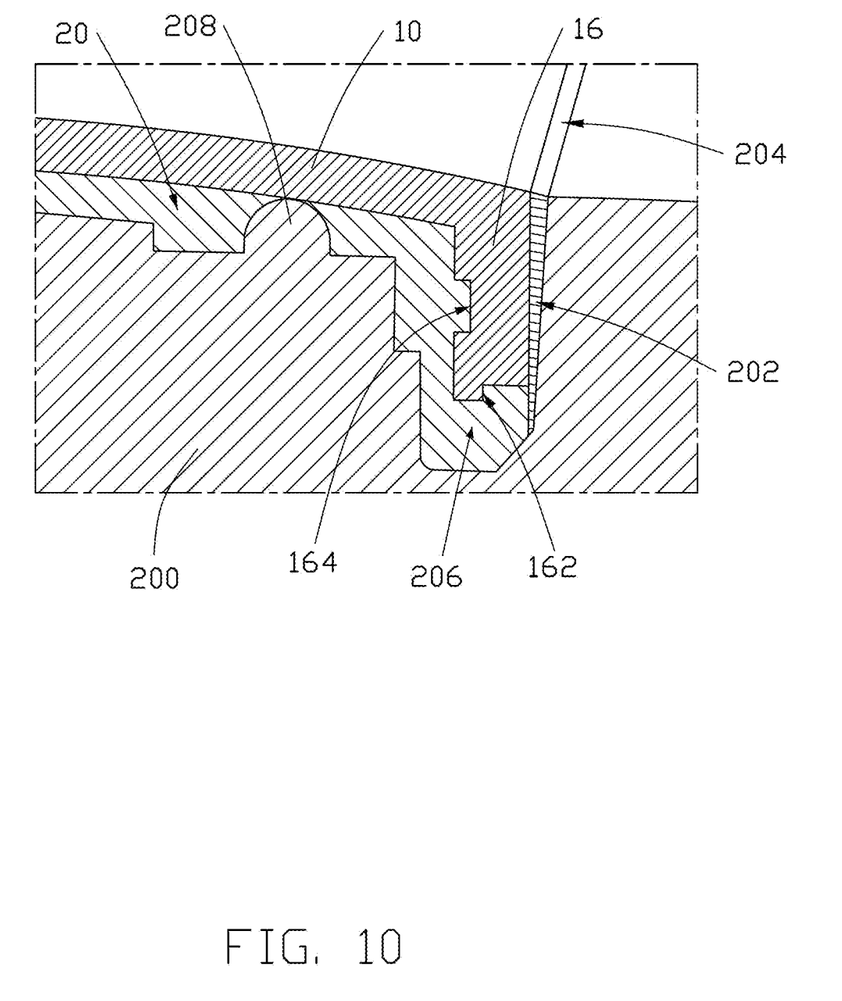
FIG. 10 illustrates a cross section along view line VII-VII of FIG. 9.

Referring to FIGS. 8-10, each of the feeding inlets 202 has a tapered area in a direction towards the mold 200, that is, the cross-section area of the feeding inlets 202 becomes smaller in the inflowing direction of the resin. The feeding inlets 202 have shape of a frustum of a square in this embodiment.

Referring to FIG. 10, a flared inlet is provided between the first step 162 and the mold 200 for promoting flow of the liquid resin to other portions on the inner surface of the sheet metal 10 from the feeding inlet 202.

In a direction perpendicular to the sheet metal 10, the first step 162 has a height dimension h1 between 0.25 mm-0.35 mm and a width dimension w1 between 0.75 mm-0.85 mm. In this embodiment, h1=0.3 mm, w1=0.8. It should be understood that, h1 can be selected from 0.25 mm, 0.26 mm, 0.27 mm, 0.28 mm, 0.29 mm, 0.31 mm, 0.32 mm, 0.33 mm, 0.34 mm, 0.35 mm, etc., w1 can be selected from 75 mm, 0.76 mm, 0.77 mm, 0.78 mm, 0.79 mm, 0.81 mm, 0.82mm, 0.83 mm, 0.84 mm, 0.85 mm, etc.

Step S18: arranging injection nozzles 204, the injection nozzles 204 are arranged in the feeding inlets 202.

Figure 11:
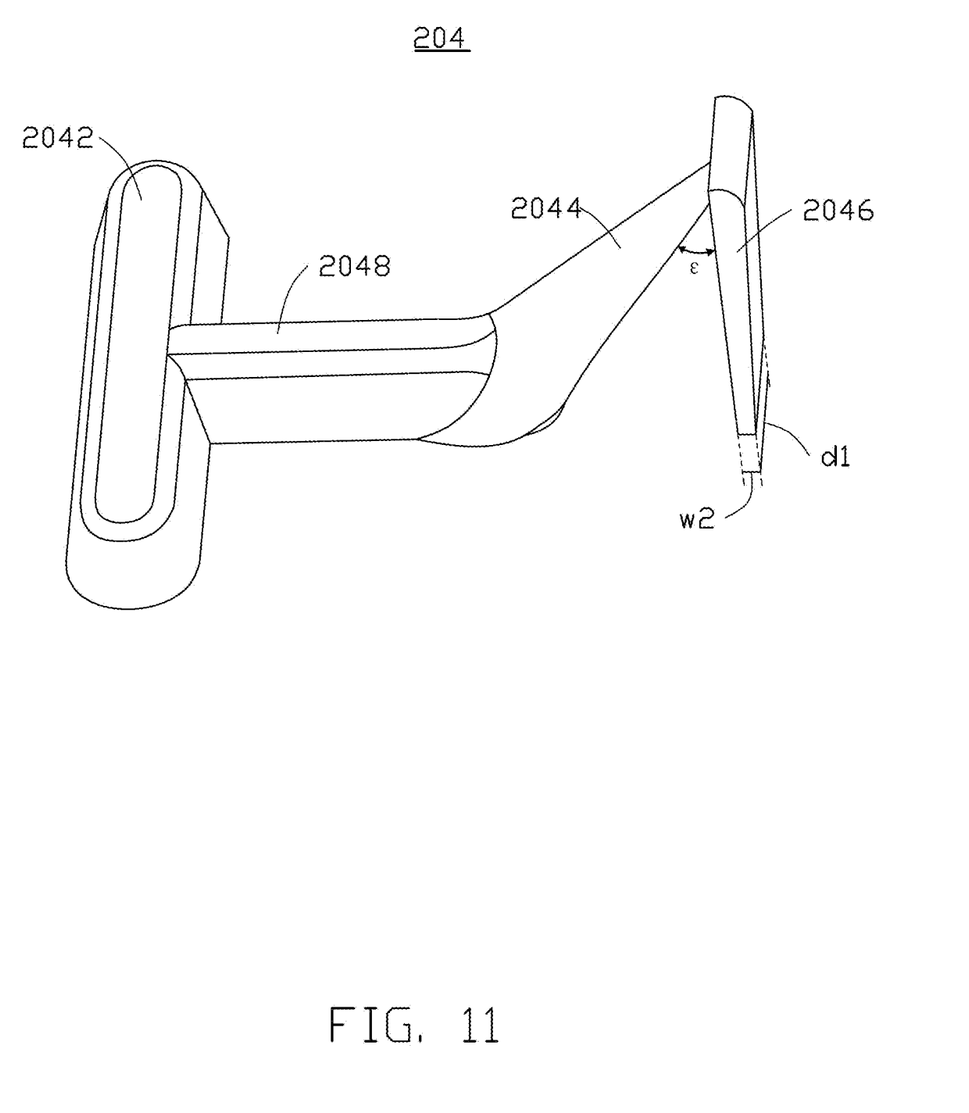
FIG. 11 illustrates a perspective view of an injection nozzle for the insert molding process of another embodiment according to the present disclosure.

Referring to FIG. 11, the injection nozzle 204 comprises a first conduit 2042, a second conduit 2044, and a feeding nozzle 2046 connected in turn, the liquid resin from the injection machine flows through the first conduit 2042 and the second conduit 2044 and is fed into the feeding inlet 202 via the feeding nozzle 2046. An acute fifth angle c is formed between the second conduit 2044 and the feeding nozzle 2046. Thereby, the injection nozzle 204 is arranged in the feeding inlets 202 for injection molding.

In this embodiment, the feeding nozzle 2046 at the end away from the second conduit 2044 has a length of d1 between 7.5 and 8 mm and a width of w2 between 0.75 and 0.85 mm. It should be understood that, d1 can be selected from 7.5 mm, 7.6 mm, 7.7 mm, 7.8 mm, 7.9 mm, 8 mm, 8.1 mm, 8.2 mm, 8.3 mm, 8.4 mm, 8.5 mm, etc., and d1 is preferred to be 8 mm. Dimension w1 can be selected from 0.75 mm, 0.76 mm, 0.77 mm, 0.78 mm, 0.79 mm, 0.8 mm, 0.81 mm, 0.82 mm, 0.83 mm, 0.84 mm, 0.85 mm, etc., and w1 is preferred to be 0.8 mm.

In further embodiments, the injection nozzle 204 further comprises a third conduit 2048 connected between the first conduit 2042 and the second conduit 2044. The longitudinal direction of the third conduit 2048 is perpendicular to that of the first conduit 2042, the feeding nozzle 2046 extends in a direction perpendicular to the plane of the third conduit 2048 and the first conduit 2042. The second conduit 2044, which has a fifth angle c with the feeding nozzle 2046, intersects with the plane of the third conduit 2048 and the first conduit 2042. Such arrangement allows the second conduit 2044 to be more inclined, which shortens the length of the second conduit 2044 and the distance that the fluid resin must flow.

Step S20: insert molding, a nano molding process is performed on the inner surface of the sheet metal 10 to form a molded plastic part 20 between the mold 200 and the sheet metal 10, the molded plastic part 20 is firmly fixed to the sheet metal 10 as the resin is solidified in the nano-sized pits on the sheet metal 10.

In further embodiments, fastenings such as copper screws are arranged on the inner surface of the sheet metal 10 before the insert molding process, thereby the fluid resin fed in can submerge and further secure the fastenings in the molded plastic part.

For example, fastenings arranged near the first area 13 and the second area 14 are configured for hinges of the notebook computer. The fluid resin is one of PPS (Polyphenylene Sulfide) and PA (Polyamide), or a mixture.

Step S22: removing the mold 200.

In this embodiment, the mold 200 is arranged with a plurality of pressing points 208, pressure is applied at the pressing points 208 against the inner surface of the sheet metal 10 when the mold 200 is arranged on the sheet metal 10. This allows easy removal of the mold 200 from the sheet metal 10. Each pressing point 208 is configured with a spherical end to make contact with the sheet metal 10 without hindering the flow of the liquid resin.

Figure 12:
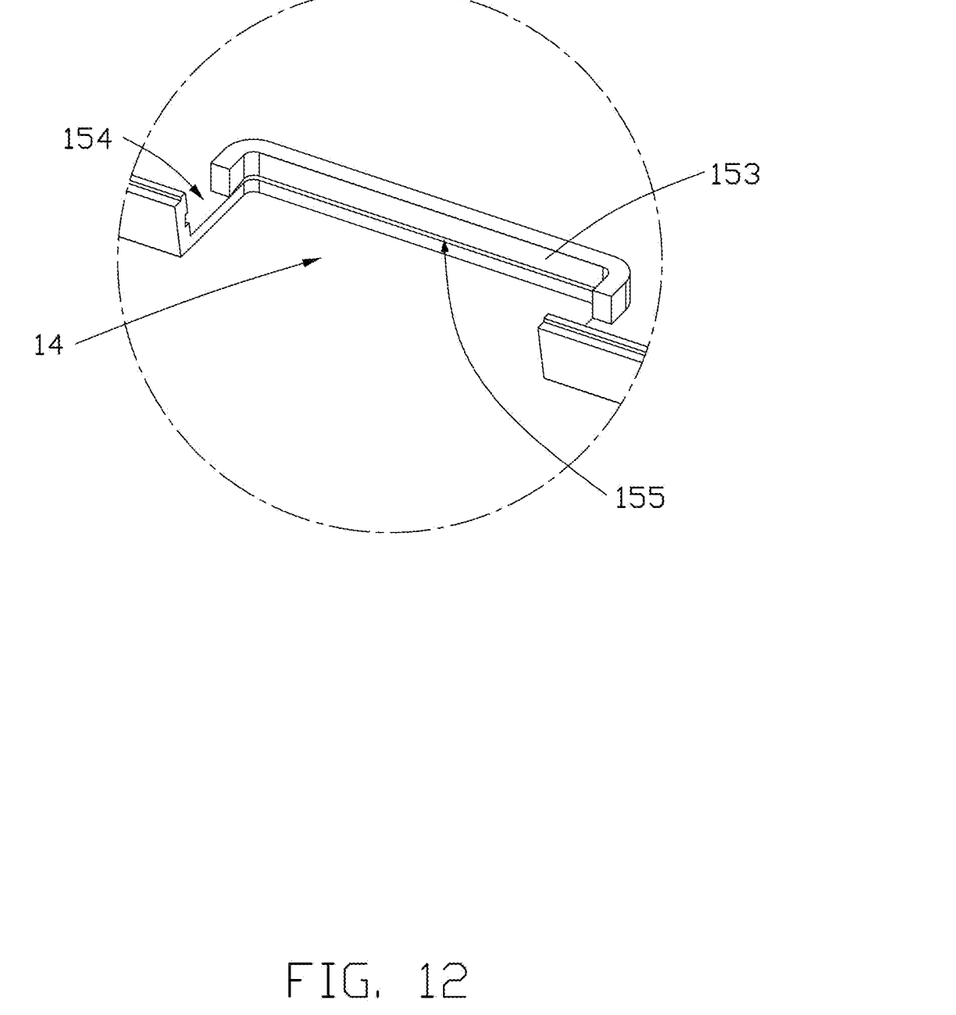
FIG. 12 illustrates the second area of the metal shell processed by step S23 of the manufacturing process of another embodiment according to the present disclosure.

Referring to FIG. 12, in further embodiment, after step S22, the manufacturing process of the metal shell 100 further comprises following steps.

Step S23: machining the hinge side wall 153. Step S23 includes following sub-steps:

Step S232: cutting the hinge side wall 153, the hinge side wall 153 is cut at the portion adjacent to the side walls 16 to form gaps 154 between the hinge side wall 153 and the side wall 16. The molded plastic part 20 is exposed in the gaps 154 for connecting with hinge of the notebook computer.

Step S234: milling the hinge side wall 153. The hinge side walls 153 are milled at their root to form a second step 155 on outer side of the hinge side wall 153, the second step 155 is formed at point of connection of the hinge side wall 153 and the sheet metal 10, which facilitates assembly of the metal shell 100.

In further embodiment, after step S22 or S23, the manufacturing process of the metal shell 100 further comprises following steps.

Step S24: performing a fine machining on the sheet metal 10.

Figure 13:
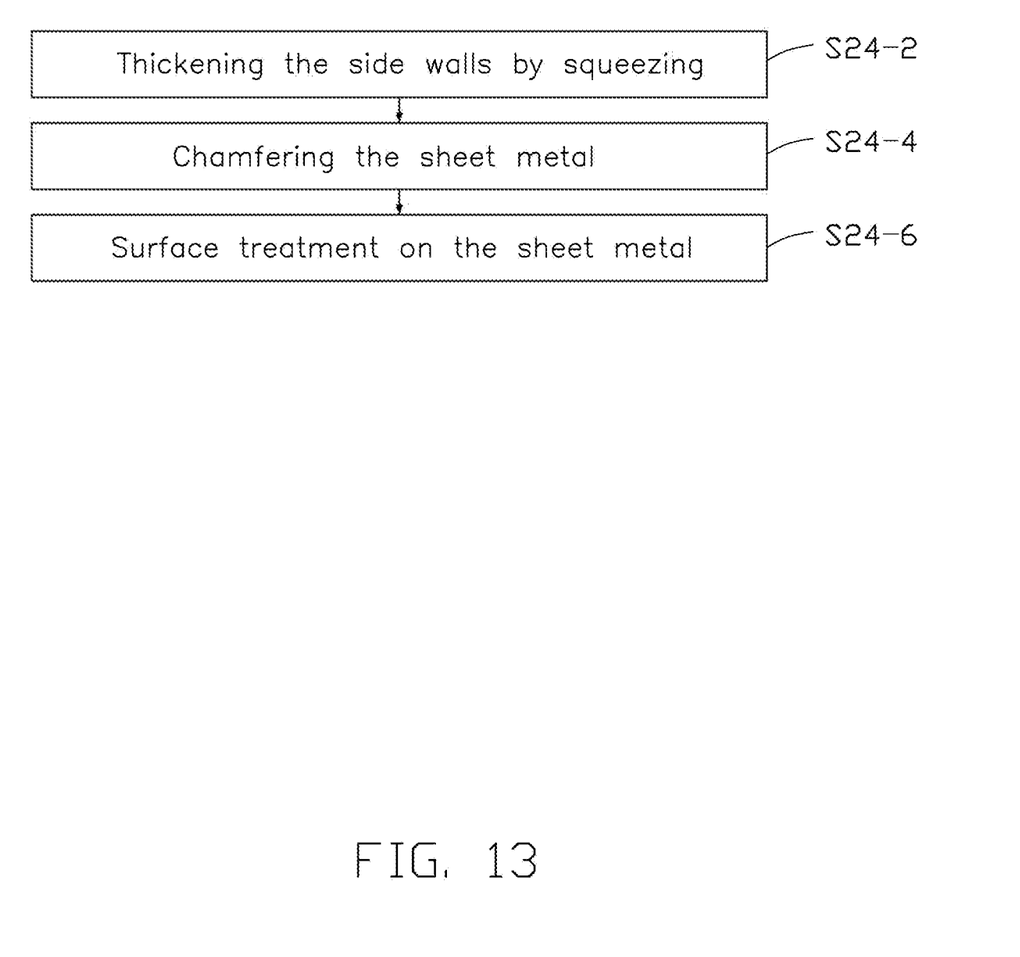
FIG. 13 is a flow diagram of step S24 of the first embodiment according to the present disclosure.

Referring to FIG. 13, the step S24 comprises following sub-steps.

S24-2: thickening the side walls 16 by squeezing, until the thickness of the side wall 16 satisfies a third parameter.

The preferred third parameter is a dimension of 0.9 mm-1.1 mm, it can be selected from 0.9 mm, 0.91 mm, 0.92 mm, 0.93 mm, 0.94 mm, 0.95 mm, 0.96 mm, 0.97 mm, 0.98 mm, 0.99 mm, 1 mm, 1.01 mm, 1.02 mm, 1.03 mm, 1.04 mm, 1.05 mm, 1.06 mm, 1.07 mm, 1.08 mm, 1.09 mm, 1.1 mm etc.

S24-4: chamfering the sheet metal 10. The external corners on outer side of the sheet metal 10 are chamfered to improve the appearance of the metal shell 100.

S24-6: surface treatment on the sheet metal 10. The surface treatment comprises at least one of polishing, brush finishing, sand blasting, and anodizing, to improve the appearance of the metal shell 100.

The sub-steps S24-6 and S24-4 can be performed in different order or can be combined in any way. For example, after S24-2, the outer surface of the sheet metal 10 is processed by polishing, brush finishing, chamfering, sand blasting, and anodizing in sequence.

According to a further embodiment, a metal shell 100 is provided. The metal shell 100 comprises a sheet metal 10 and a molded plastic part 20 attached to circumference of inner surface of the sheet metal 10, the sheet metal 10 is arranged with hinge side walls 153 and side walls 16. The hinge side walls 153 and the side walls 16 are formed by stamping and squeezing, the molded plastic part 20 is engaged with inner surfaces of the side walls 16 and the inner surface of the sheet metal 10.

The metal shell 100 can be a shell for encasing a display screen on a notebook computer, or a backside shell for encasing a tablet computer, a mobile phone, and other device.

In this embodiment, in the process of insert molding, feeding inlets formed between the mold 200 and the side walls 16 are shaped as frustum of square, which facilitates the insert molding process.

In this embodiment, the mold 200 is arranged with a plurality of pressing points 208, pressure is applied at the pressing points 208 against the inner surface of the sheet metal 10 when the mold 200 is arranged on the sheet metal 10, therefore the mold 200 can be easily to be removed from the sheet metal 10.

The present disclosure provides the metal shell 100 and the manufacturing process thereof, wherein the sheet metal 10 is stamped, squeezed, and milled at the first area 13 and the second area 14 to form the hinge side walls 153 for hinges of the notebook computer; the sheet metal 10 is stamped, squeezed, and milled at the periphery to form the side walls 16; the molded plastic part 20 is formed on the inner surface of the sheet metal 10 by insert molding process, the molded plastic part 20 is configured for connecting with elements of the notebook computers. The metal shell 100 produced by the manufacturing process mentioned above is integrally formed from a solid sheet of metal plate 10, the manufacturing process is simple and economical as CNC processes are reduced, which is conducive to market popularization and customer satisfaction.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A manufacturing process method of a metal shell, comprises:
   S2: stamping and hollowing out a sheet metal, wherein the sheet metal is stamped at a first area and a second area to form two lug bosses, then top portions of the two lug bosses are hollowed to form notches with flanges on the sheet metal, the first area and the second area are located on a same side of the sheet metal;
   S4: thickening the flanges by squeezing, wherein the flanges surrounding the notches are squeezed until a thickness of each of the flanges satisfies a first parameter S6: milling the flanges, wherein the flanges are milled to have a height satisfies a second parameter, the flanges cooperatively form hinge side walls;
   S8: stamping the sheet metal, wherein a periphery of the sheet metal except for the first area and the second area is stamped to form side walls;
   S10: thickening the side walls by squeezing, wherein each of the side walls is squeezed until a thickness of each of the side walls satisfies the first parameter;
   S12: milling the side walls until a height of each of the side walls satisfies a second parameter;
   S14: T treatment, roughening the sheet metal by a T treatment process to form nano-sized pits on an inner surface of the sheet metal;
   S16: providing a mold on the sheet metal by placing the mold on the sheet metal, feeding inlets being formed between the mold and the side walls of the sheet metal;
   S18: arranging injection nozzles in the feeding inlets;
   S20: performing an insert molding process on the inner surface of the sheet metal to form a molded plastic part between the mold and the sheet metal, fixing the molded plastic part to the sheet metal;

S22: removing the mold;

S24: performing a fine machining of the sheet metal.

2. The manufacturing process method of claim 1, wherein the step S2 further comprises following sub-steps:

S2-2: stamping the sheet metal to divide the metal sheet into a stamped area and an unpunched area, the sheet metal is stamped at the first area and the second area to form the stamped area, a first angle is formed between the stamped areas of the sheet metal and a plane perpendicular to the unpunched area of the sheet metal, wherein the first angle is an acute angle;

S2-4: stamping the sheet metal a second time, the sheet metal is stamped at the first area and the second area to form right angles between the stamped areas and the unpunched area of the sheet metal, wherein two lug bosses are formed at the first area and the second area;

S2-6: hollowing out top portions of the two lug bosses, the top portions are removed to form two notches with flanges on the sheet metal.

3. The manufacturing process method of claim 2, wherein the step S8 further comprises:

S8-2: stamping the sheet metal, the periphery of the sheet metal except for the first area and the second area is stamped to form a second angle between the periphery of the sheet metal except for the first area and the second area and the plane perpendicular to the unpunched area of the sheet metal, the second angle is an acute angle;

S8-4: stamping the sheet metal a second time, the sheet metal is stamped at the periphery of the sheet metal except for the first area and the second area to form right angles between the periphery of the sheet metal except for the first area and the second area and the unpunched area of the sheet metal expect for the periphery of the sheet metal, then the side walls can be formed.

4. The manufacturing process method of claim 1, wherein the sheet metal comprises a first side and a second side, the two notches are formed at the first side.

5. The manufacturing process method of claim 1, further comprises a step S13 between S12 and S14, the step S13 comprises:

bending the side walls, the side walls on the first side and the second side are bent, wherein a third angle is formed between the side walls on the first side and the sheet metal, and a fourth angle is formed between the side walls on the second side and the sheet metal.

6. The manufacturing process method of claim 1, wherein each of the feeding inlets has a tapered area in a direction towards the mold.

7. The manufacturing process method of claim 6, wherein a first step is formed on an end of each of the side walls away from the sheet metal expect for the lug bosses and the side walls for providing a flared inlet between the first step and the mold, the flared inlet is connected to the feeding inlet;

the side wall is further provided with a groove on the inner side of the side wall, and the groove extends in the longitudinal direction of the side wall.

8. The manufacturing process method of claim 7, wherein the mold is arranged with a plurality of pressing points, the inner surface of the sheet metal is pressed at the pressing points when the mold is arranged on the sheet metal.

9. The manufacturing process method of claim 8, wherein the injection nozzle comprises a first conduit, a second conduit, and a feeding nozzle connected in turn, liquid resin flows from an injection machine through the first conduit and the second conduit and is fed into the feeding inlet via the feeding nozzle;

a fifth angel, which is an acute angle, is formed between the second conduit and the feeding nozzle.

10. The manufacturing process method of claim 9, wherein an end of the feeding nozzle away from the second conduit has a lengthways dimension d1, between 7.5-8 mm and a widthways dimension w2 between 0.75-0.85 mm.

11. The manufacturing process method of claim 1, further comprises following steps between S22 and S24:

Step S23: machining the hinge side walls, wherein the Step S23 includes following sub-steps:

S23-2: cutting the hinge side wall to form gaps between the hinge side walls and the side walls;

S23-4: milling the hinge side wall to form a second step on outer side of the hinge side walls.

12. The manufacturing process method of claim 1, wherein the step S24 comprises following steps:

S24-2: thickening the side walls by squeezing, until the thickness of the side wall satisfy a third parameter;

S24-4: chamfering the sheet metal, external corners on outer side of the sheet metal are chamfered.

13. The manufacturing process method of claim 12, wherein the step S24 further comprises following sub-step:

S24-6: surface treatment on the sheet metal, the surface treatment comprises at least one of: polishing, brush finishing, sand blasting, and anodizing, to improve the appearance of the metal shell.

14. A metal shell produced by the manufacturing process method of claim 1, wherein comprises:

a sheet metal;

a molded plastic part attached to circumference of inner surface of the sheet metal;

wherein the sheet metal is arranged with hinge side walls and side walls, the hinge side walls and the side walls are formed by stamping and squeezing processes, the molded plastic part is engaged with inner surfaces of the side walls and the inner surface of the sheet metal.

* * * * *